(12) United States Patent
Hung

(10) Patent No.: US 6,394,403 B1
(45) Date of Patent: May 28, 2002

(54) SUPPORTING DEVICE FOR A LIQUID CRYSTAL DISPLAY

(76) Inventor: Ray Hung, No. 11-2, Wu-Nan Rd., Wu-Chi Chen, Taichung Hsien (TW)

( * ) Notice: Subject to any disclaimer, the term of this patent is extended or adjusted under 35 U.S.C. 154(b) by 0 days.

(21) Appl. No.: 09/698,401

(22) Filed: Oct. 27, 2000

(51) Int. Cl.⁷ .................................................. E04G 3/00
(52) U.S. Cl. ............................... 248/276.1; 248/278.1; 248/917; 248/919
(58) Field of Search .......................... 248/278.1, 279.1, 248/280.11, 276.1, 415, 917, 919, 923, 921, 922; 411/352, 353, 539

(56) References Cited

U.S. PATENT DOCUMENTS

| | | | | |
|---|---|---|---|---|
| 1,368,525 A | * | 2/1921 | Parks ........................... | 301/68 |
| 1,432,294 A | * | 10/1922 | Jungk ........................... | 301/68 |
| 2,658,699 A | * | 11/1953 | Rovas ...................... | 242/118.5 |
| 4,274,323 A | * | 6/1981 | Resnicow .................... | 411/427 |
| 4,836,478 A | * | 6/1989 | Sweere ...................... | 248/279.1 |
| 5,106,252 A | * | 4/1992 | Shapton ....................... | 411/519 |
| 5,400,993 A | * | 3/1995 | Hamilton .................. | 248/279.1 |
| 5,553,820 A | * | 9/1996 | Karten et al. ............. | 248/181.2 |
| 5,799,917 A | * | 9/1998 | Li ............................ | 248/284.1 |
| 5,975,472 A | * | 11/1999 | Hung ....................... | 248/278.1 |
| 6,012,693 A | * | 1/2000 | Voeller et al. ........... | 248/279.1 |
| 6,019,332 A | * | 2/2000 | Sweere et al. .......... | 248/280.11 |
| 6,113,046 A | * | 9/2000 | Wang ...................... | 248/278.1 |

* cited by examiner

Primary Examiner—Anita King
Assistant Examiner—Naschica S Morrison
(74) Attorney, Agent, or Firm—William E. Pelton, Esq.

(57) ABSTRACT

A supporting device for a liquid crystal display includes a clip fixed to a frame, a base secured to the clip, an arm pivotally linked to the base, an adjustment device installed in the base, a cylinder device contained in the arm and pivotally linked to the adjustment device, and a positioning device formed on the top of the arm. The adjustment device has a simple structure and is able to adjust an angle of the cylinder device with respect to the arm to support displays of different weight.

3 Claims, 8 Drawing Sheets

SUPPORTING DEVICE FOR A LIQUID CRYSTAL DISPLAY

BACKGROUND OF THE INVENTION

1. Field of the Invention

The invention relates to a supporting device for a liquid crystal display, especially to a supporting device that is simple in production and assembly, and able to provide a large adjusting angle for the liquid crystal display attached thereto.

2. Description of Related Art

Liquid crystal displays are widely used in public places such as airports, railway stations, stores, and public squares, etc. They are usually fixed to a frame by a supporting device. Shown in FIGS. 5, 6, 7 and 8 is such a supporting device. The device includes a clip (20) that is able to be secured to a frame, a base (21) formed on the clip (20), an adjustment means, an arm (30), and a positioning means formed on a top of the arm (30). A cylinder means is contained in the arm (30). The cylinder means has a shaft (301) received in a shaft tube (300). The arm (30) and the shaft (301) are pivotally connected to the adjustment means. A free end of the shaft tube (300) is pivotally linked to the arm (30). In order to bear liquid crystal displays of different weights, an angle of the cylinder means with respect to the arm (30) must be adjustable. Adjustment is released via the adjustment means. The adjustment means has an outer seat (40) having a slot (41), an inner seat (45) having a pair of legs, a pin (42), a long bolt (43), and, a slidable pin (44). A leg slot (451) is defined in each leg of the inner seat (45). In assembly, the inner seat (45) is first put into the outer seat (40) and secured by bolts. Then the pin (42) is installed in the slot (41) with two ends thereof being inserted into two openings defined in a pair of ears. Then the slidable pin (44) is put between the two legs with two ends (441) thereof being placed and slidable in the leg slots (451). The long bolt (43) is threaded into a thread hole traversely defined in the pin (42) and then into another thread hole traversely defined in the slidable pin (44). A shaft cover (302) has an upper portion which is able to threadedly engage with a free end of the shaft (301), and further has a lower portion which is able to ride on the slidable pin (44). To adjust the angle of the cylinder means with respect to the arm (30), a user can rotate the long bolt (43). Then the slidable pin (44) will move along the leg slots (451) and then the angle is able to be adjusted.

The positioning means includes a lower connecter (31) pivotally linked to the top of the arm (30) and an upper connecter (32) pivotally linked to the lower connecter (31). The lower connecter (31) is able to rotate left and right about the arm (30) and the upper connecter (32) is able to rotate forward and backward about the lower connecter (31). The upper connecter (32) has a top plate on which a bolt (33) is formed. The bolt (33) can go through a central opening defined in a fixing plate (34) and then threadedly engage with a nut (35). A portion of the bolt (33) that protrudes from the nut (35) is forged to form a rivet nut head and then the fixing plate is connected to the upper connecter (32). The fixing plate (34) is then able to be secured to a liquid crystal display.

From above description, it is to be seen that the conventional supporting device has the following drawbacks:

1. It has too many constituent members, some of which have a very complex shape that is difficult to manufacture;
2. Its assembly has too many steps, which will bring much inconvenience;
3. The fixing plate (34) is able to rotate with respect to the upper connecter (32) about the bolt (33);
4. The upper connecter (32) has only one ear sandwiched between two ears of the lower connecter (31) and therefore cannot provide enough support for the upper connecter (32). In actual use, the single ear often deforms due to excessive stress thereon;
5. as shown in FIG. 8, if the arm (30) is needed to be at a large angle with respect to the base (21), the shaft cover (302) will finally meet the long bolt (43). In the conventional supporting device, the angle that the arm (30) is able to rotate with respect to the base (21) is less than 90 degrees which is insufficient in actual use.

SUMMARY OF THE INVENTION

The main object of the invention is to provide a supporting device for liquid crystal display that is simple in structure, easy to assemble, and able to provide a secure support for a display installed thereto.

Other objects, advantages and novel features of the invention will become more apparent from the following detailed description when taken in conjunction with the accompanying drawings.

DETAILED DESCRIPTION OF THE PREFERRED EMBODIMENT

Figure 1:
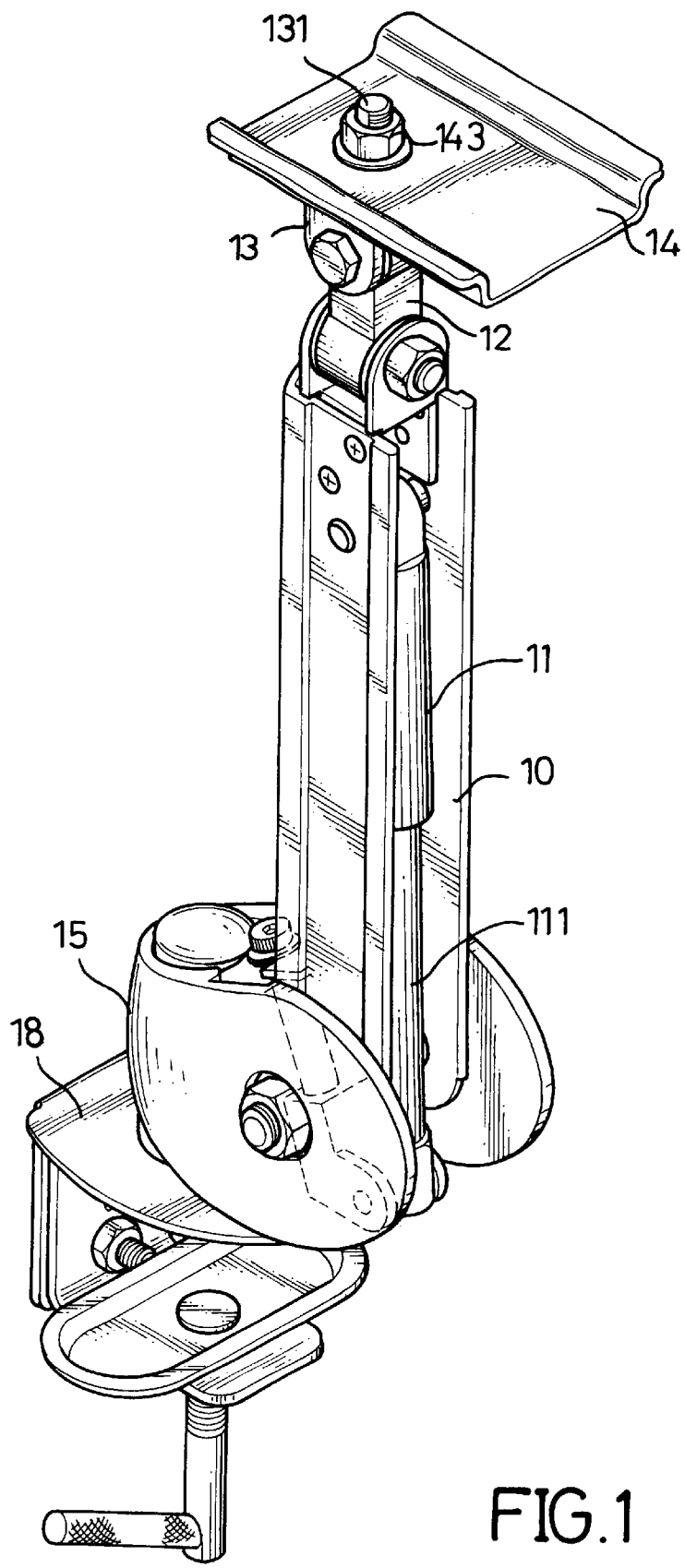
FIG. 1 is a perspective view of a support for an LCD in accordance with the invention.
Figure 2:
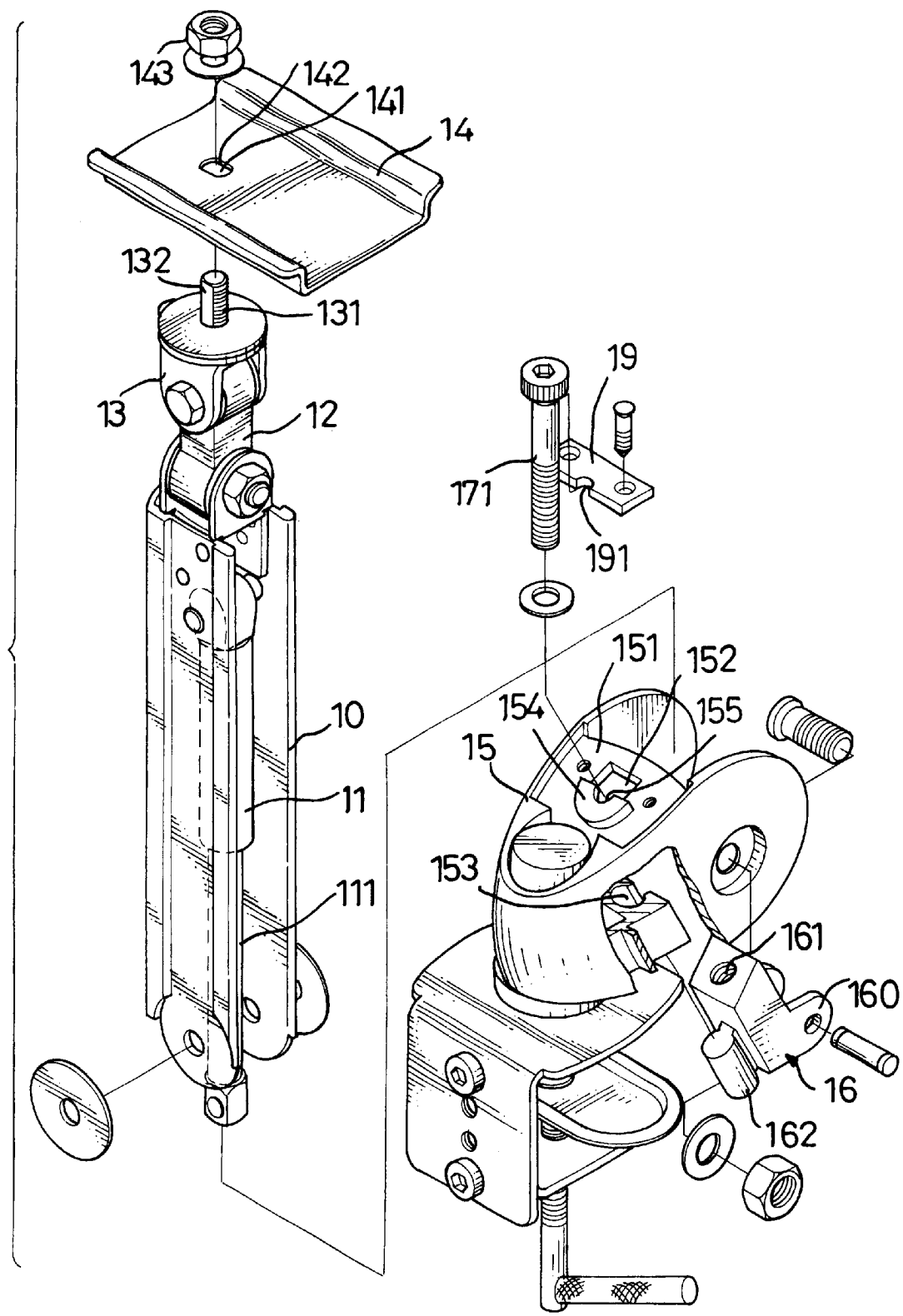
FIG. 2 is an exploded perspective view of the invention.
Figure 3:
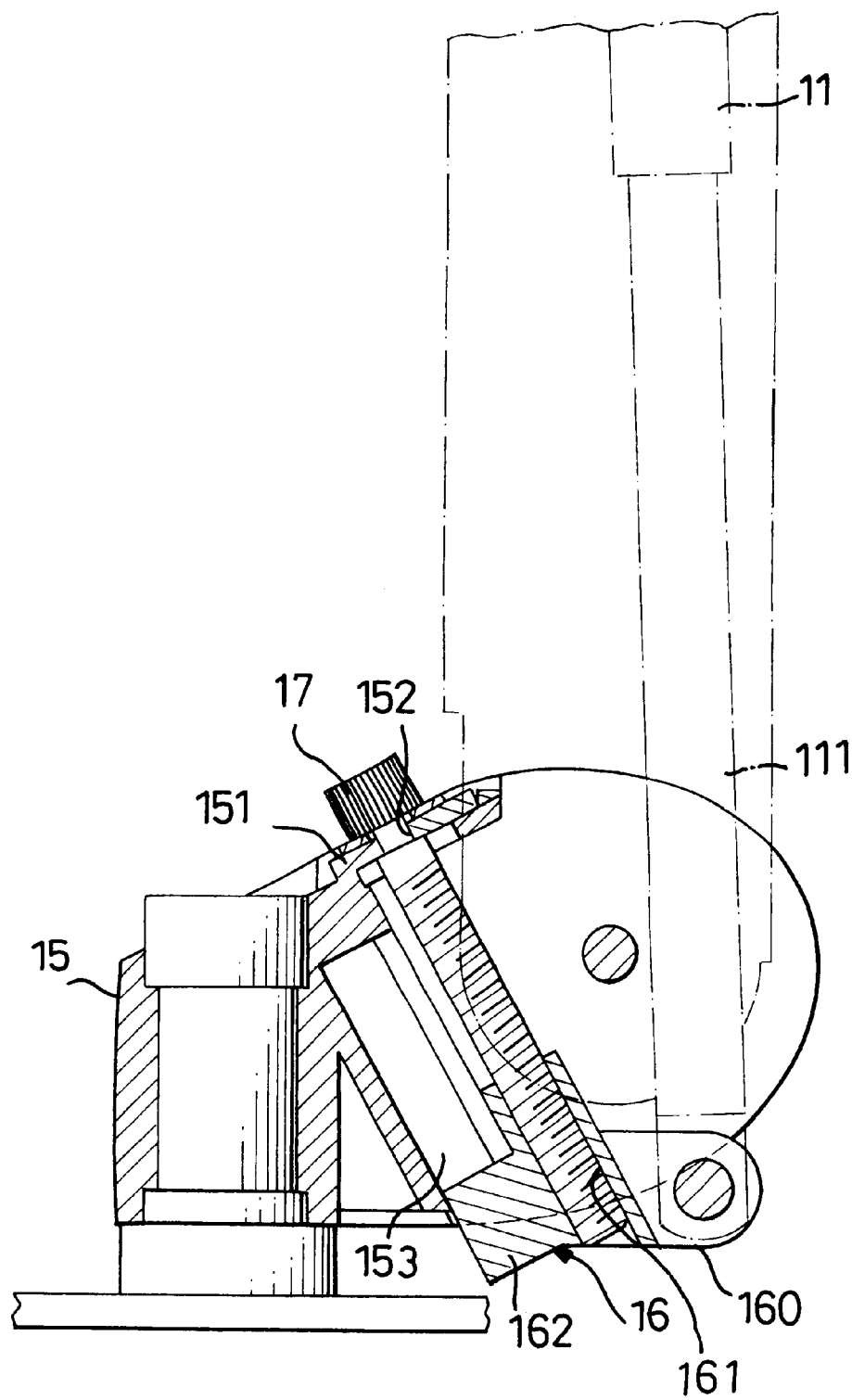
FIG. 3 is a cross sectional view of the invention showing the arm and the base.

With reference to FIGS. 1, 2, and 3, the invention, a supporting device for liquid crystal display, is shown. The device includes a clip (18) that is able to be secured to a frame, a base (15) formed on the clip (18), an adjustment means, an arm (10), and a positioning means formed on a top of the arm (10). A cylinder means is contained in the arm (10). The cylinder means has a shaft (111) received in a shaft tube (11). The arm (10) and the shaft (111) are pivotally connected to the base (15) and the adjustment means, respectively. A free end of the shaft tube (11) is pivotally linked to the arm (10). In order to bear liquid crystal displays of different weights, an angle of the cylinder means with respect to the arm (10) is adjustable.

The base (15) is substantially U-shaped having a pair of ears between which the arm (10) is pivotally linked. The adjustment means has a top plate (151) formed on the pair of ears. When the arm (10) is rotated upward, it will finally meet and is stopped by the top plate (151). This position is named a first position of the arm (10). When the arm (10) is in its first position, the top plate (151) is at a certain angle with respect to the arm (10). An opening (152) is defined in the top plate (151).

A bar having a longitudinal direction groove (153) is formed on the base (15) between the pair of ears and under the top plate (151). A cross sectional view of the direction groove (153) is formed as a C. An axis of the C-shaped direction groove (153) is substantially vertical to the top plate (151).

A slidable seat (16) is also provided between the pair of ears and under the top plate (151). The slidable seat (16) basically has a top surface, a front surface, and a rear surface. A pair of slidable seat ears (160) is formed on the front surface, a thread hole (161) is defined in the top surface, and a direction bar (162) is formed on the rear surface. The direction bar (162) is slidably received in the direction groove (153).

A long bolt (17) is provided having an enlarged head and a threaded shaft. A neck (171) is defined in the shaft under the head and a diameter of the neck (171) is smaller than that of the shaft. A leaf (19) is also provided having a first recess (191) that snugly receives the neck (171) of the long bolt (17). A disc (154) is formed on the top plate (151) at a periphery of the opening (152). Thicknesses of the leaf (19) and the disc (154) are substantially the same. A second recess (155) is defined in the disc (154).

In assembly, the long bolt is first inserted through the opening (152) with the leaf (119) being put under the head of the long bolt (17) and the neck (171) of the long bolt (17) being contained in a hole defined by the two recesses (191, 155). The leaf (19) is then secured to the top plate (151) by screws with the long bolt (17) rotatable in the hole defined by the two recesses (191, 155).

A free end of the shaft (111) is then pivotally linked to the pair of the slidable seat ears (160) and the direction bar (162) is inserted into the direction groove (153) from a lower end of the direction groove (153). The shaft of the long bolt (17) is aligned with the thread hole (161) defined in the slidable seat (16) and then the long bolt (17) is rotated to make the long bolt (17) and the slidable seat (16) threadedly engaged. The long bolt (17) is rotated and thus the slidable seat (16) is able to move along the direction groove (153). The slidable seat (16) will move the free end of the shaft (111) linked thereto and then the angle of the cylinder means with respect to the arm (10) is adjusted.

The positioning means has a lower connecter (12) and an upper connecter (13). The lower connecter (12) is bar-like and has a top traverse through opening and a bottom traverse through opening. The bottom opening is sandwiched between a pair of ears formed on the top of the arm (10) and pivotally connected to the arm (10) by a pin passing through the pair of ears and the bottom opening. The upper connecter (13) has a top disc on a top surface thereof and on which a bolt (131) is formed, and further has a bottom surface on which a pair of ears is formed. The top opening of the lower connecter (12) can be sandwiched between the pair of ears of the upper connecter (13) and pivotally connected to the upper connecter (13) by a pin passing through the pair of ears of the upper connecter (13) and the top opening of the lower connecter (12). Thus, the lower connecter (12) is able to rotate left and right about the arm (10) and the upper connecter (13) is able to rotate forward and backward about the lower connecter (12). The bolt (131) extends through a central opening (141) defined in a fixing plate (14) and then threadedly engage with a nut (143). At least one plane (132) parallel to an axis of the bolt (131) is defined in the bolt (131). A flat (142) corresponding to the plane (132) is defined in the central opening (141). When the bolt (13 1) is inserted into the central opening (141), the flat (142) abuts the plane (132) to retain the fixing plate (14) in a non-rotatable mode with respect to the bolt (131).

Figure 4:
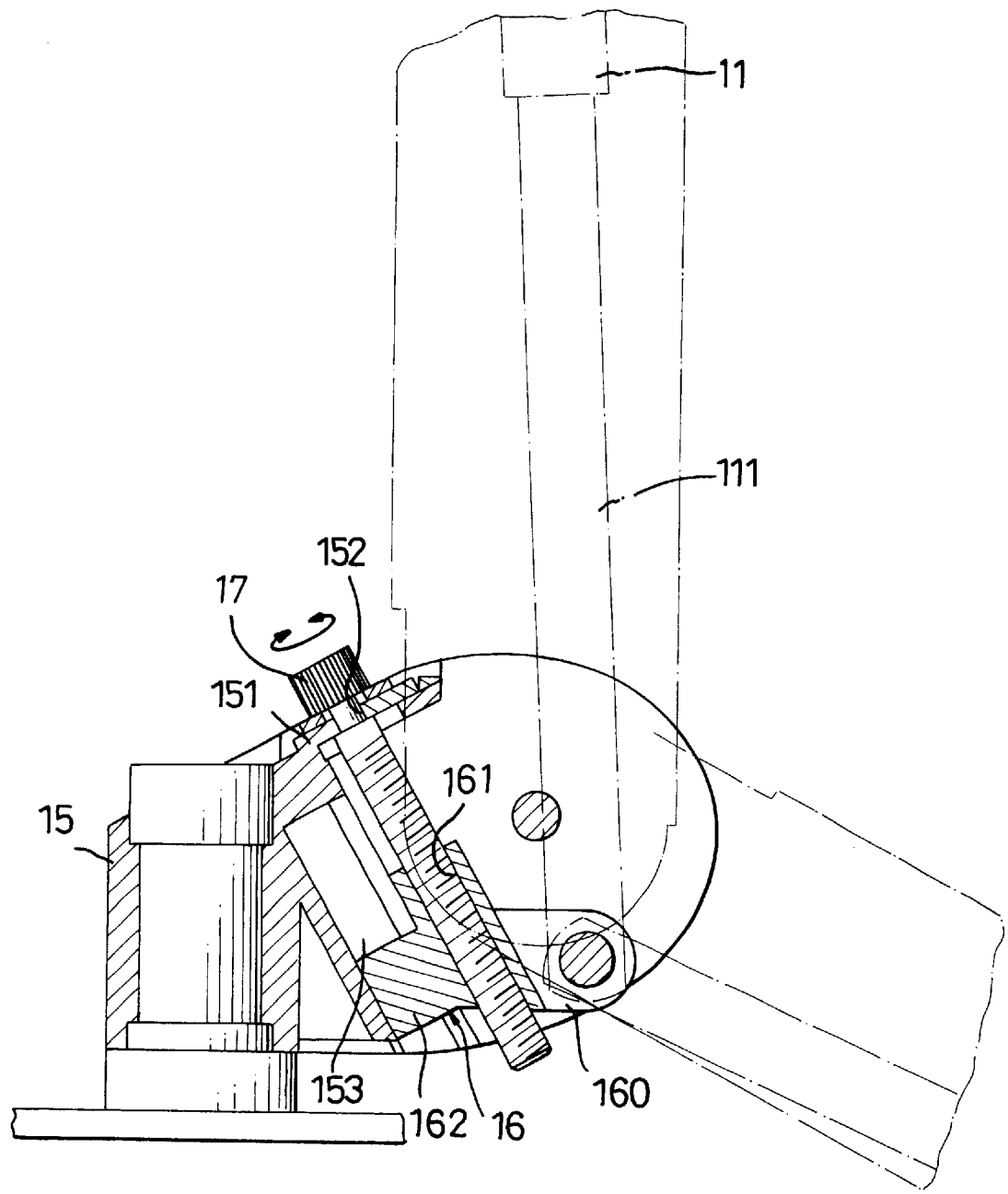
FIG. 4 is a cross sectional view showing the operation of the invention.
Figure 5:
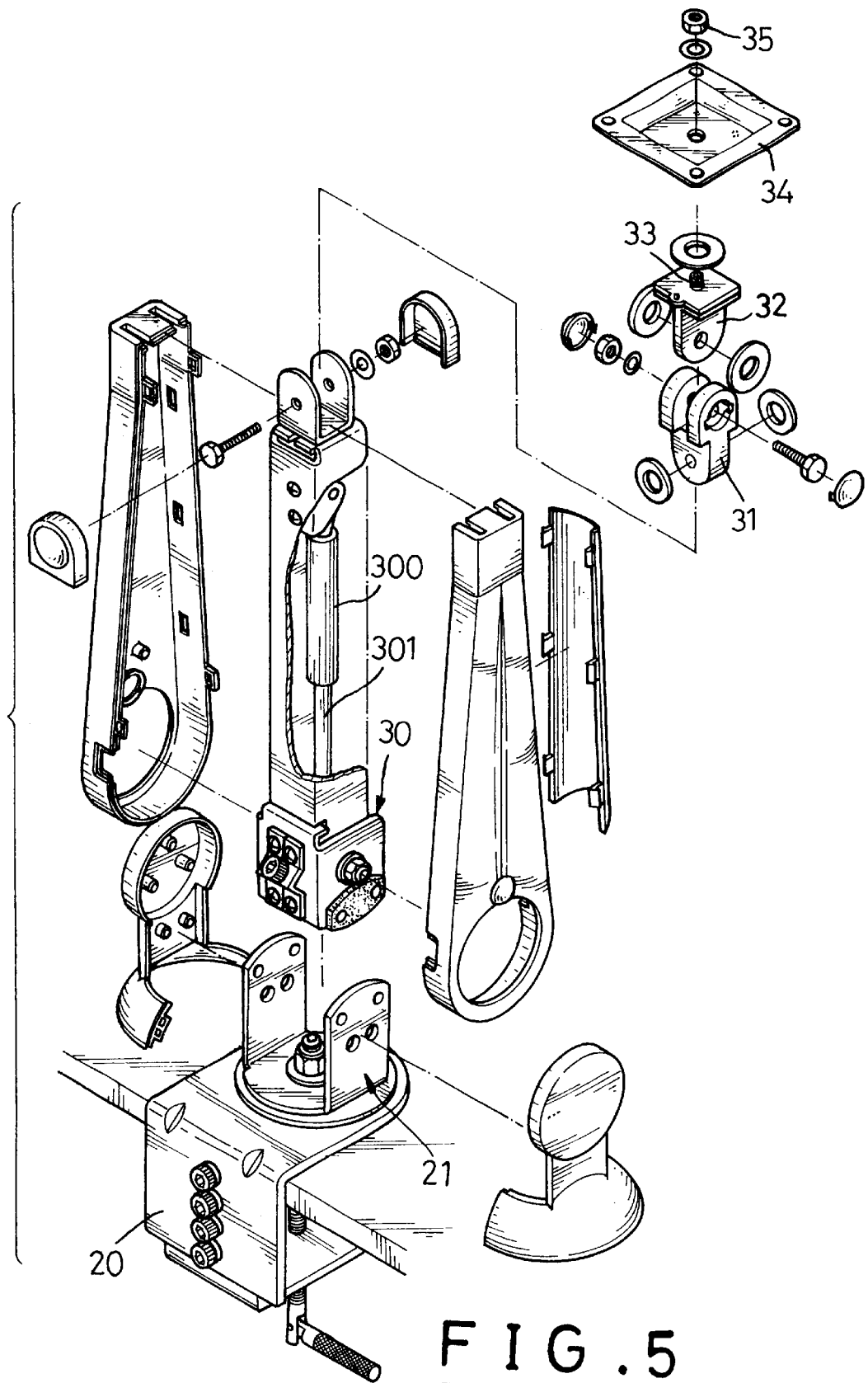
FIG. 5 is an exploded perspective view of a conventional supporting device.
Figure 6:
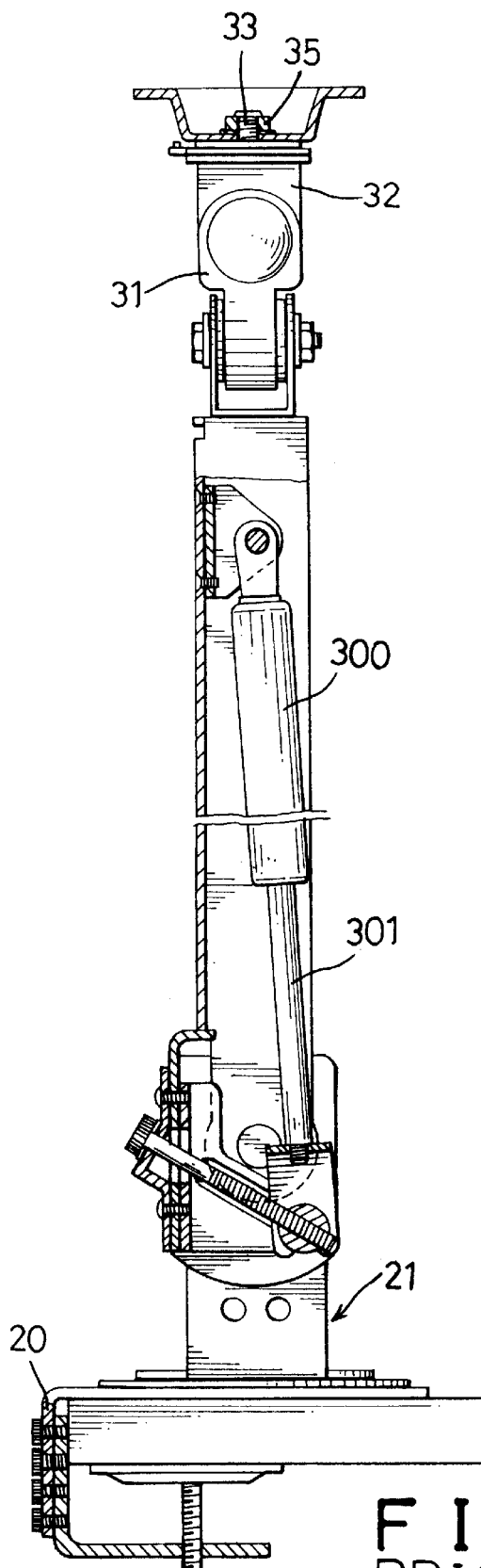
FIG. 6 is a cross sectional view of the conventional supporting device shown in FIG. 5.
Figure 7:
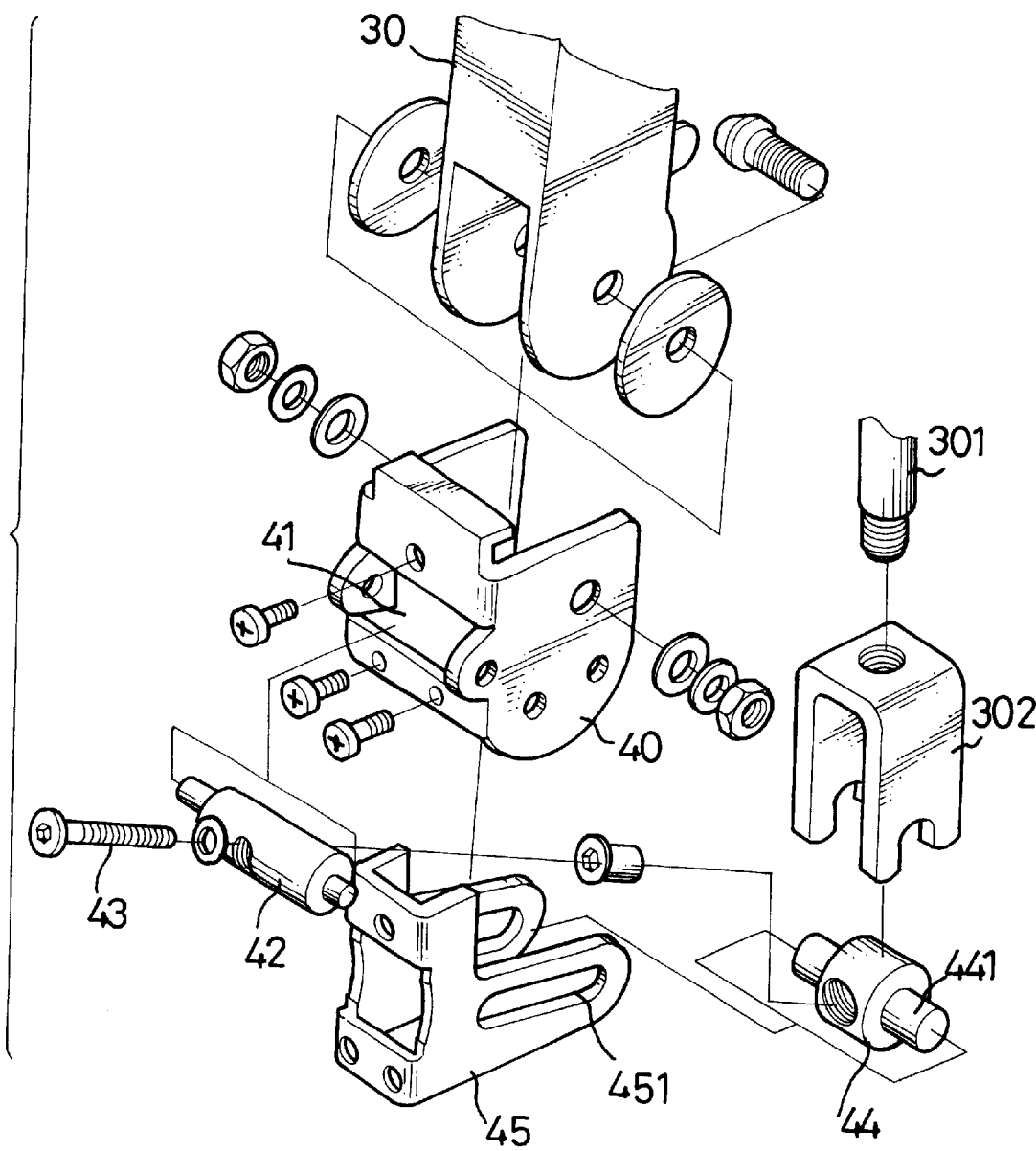
FIG. 7 is a partial exploded perspective view of the conventional supporting device shown in FIG. 5; and, FIG. 8 is a partial cross sectional view of the conventional supporting device shown in FIG. 5 showing a status that the shaft cover is finally stopped by the long bolt.
Figure 8:
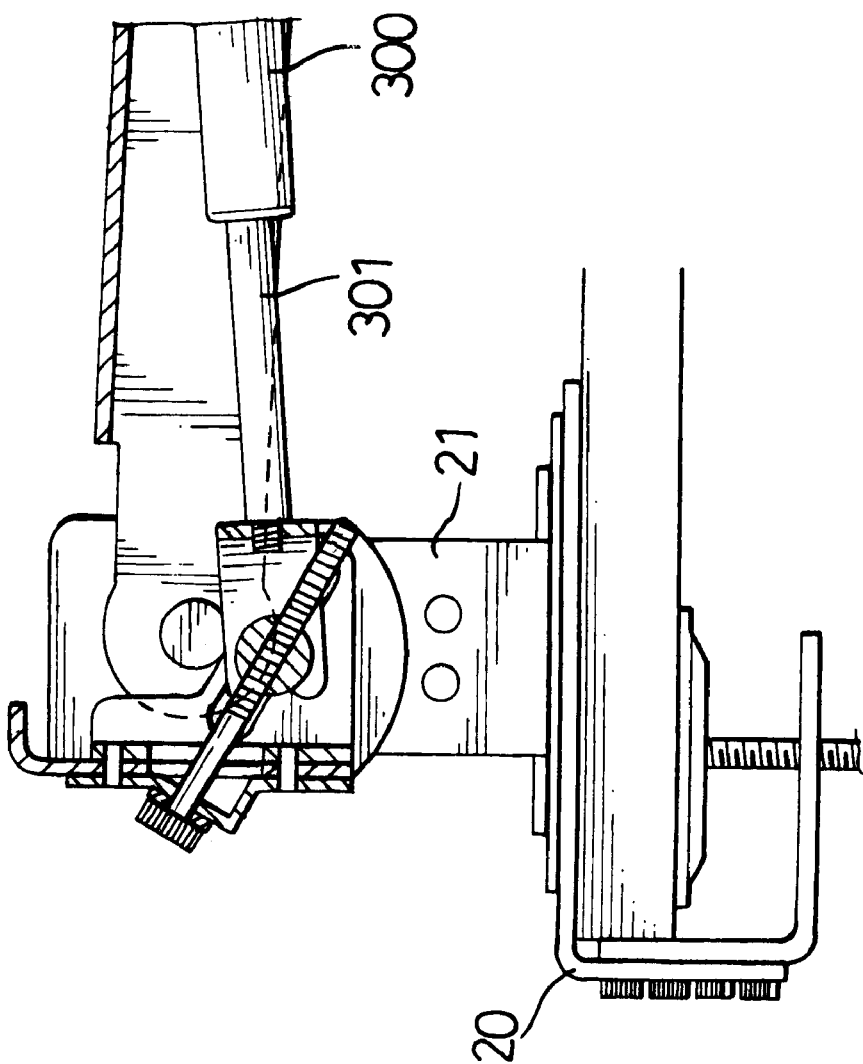

From above description, it is to be understood that compared with the conventional supporting device, the invention:

1. has many fewer constituent members;
2. is easy to be assembled;
3. The fixing plate (14) is no longer able to rotate with respect to the upper connecter (13) about the bolt (131);
4. has the bar-like lower connecter (12) sandwiched between the pair of ears of the upper connecter (13) and is able to provide a strong enough support for the fixing plate;
5. As shown in FIG. 4, the arm (10) is able to rotate a large angle with respect to the base (15) without being stopped by any member of the supporting device.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A supporting device for a liquid crystal display, the device having a clip, a base secured to the clip, an adjustment means installed in the base, an arm pivotally linked to the base, a cylinder means contained in the arm and pivotally linked to the adjustment means, a positioning means formed on a top of the arm, the cylinder means having a shaft contained in a shaft tube, wherein the improvements comprise:

the base being substantially U shaped and having a pair of ears on which the arm is pivotally linked by a pin;

the adjustment means having a top plate formed on the pair of ears of the base, a bar formed in the base and having a C-shaped direction groove, and, a slidable seat having a top surface, a front surface, and a rear surface, the top plate being retainable at a certain angle with respect to the base, the top plate having an opening, a pair of ears being formed on the front surface of the slidable seat, a threaded hole being defined in the top surface of the slidable seat, a direction bar being formed on the rear surface of the slidable seat, a long bolt having a neck with a diameter smaller than a diameter of a shaft thereof, a leaf having a recess being able to receive the neck of the long bolt, wherein in assembly, the direction bar is inserted and slidably received in the C-shaped direction groove, a free end of the shaft of the cylinder means is pivotally linked to the pair of ears of the slidable seat, the long bolt is inserted through the opening and threadedly engages with the threaded hole in the slidable seat, and finally the lead is fixed to the top plate with the recess thereof abutting the neck of the long bolt.

2. The supporting device as claimed in claim 1, wherein the positioning means has a bar-like lower connecter and an upper connecter, the lower connecter having a top traverse through opening and a bottom traverse through opening, the upper connecter having a top disc formed on a top surface thereof and the disc having a bolt formed thereon, and a pair of ears formed on a bottom surface of the disc, the lower connecter being pivotally linked to the top of the arm by a pin inserted through the bottom opening thereof and a pair of ears formed on the top of the arm, and the upper connecter being pivotally linked to the lower connecter by a pin inserted through the ears thereof and the top opening of the lower connecter, whereby the bolt extends through a central opening defined in a fixing plate and then threadedly engages with a nut, wherein the fixing plate is able to be installed onto a display.

3. The supporting device as claimed in claim 2, wherein the bolt has at least one plane parallel to an axis of the bolt, and the central opening in the fixing plate has at least one flat corresponding to the at least one plane in the bolt, and when the bolt is inserted through the central opening, the at least one flat abuts the plane thereby securing the fixing plate in a non-rotatable mode with respect to the bolt.

\* \* \* \* \*